ated Mar. 30, 1976

United States Patent
Keyes et al.

[11] 3,946,944
[45] Mar. 30, 1976

[54] METHOD OF HEATING A BUILDING STRUCTURE WITH SOLAR HEAT

[75] Inventors: John Harold Keyes; Charles Irvin Strickland; Robert George Strickland, all of Nederland, Colo.

[73] Assignee: International Solarthermics Corporation, Nederland, Colo.

[22] Filed: Oct. 16, 1974

[21] Appl. No.: 515,236

Related U.S. Application Data

[62] Division of Ser. No. 445,473, Feb. 25, 1974.

[52] U.S. Cl. .................... 237/1 A; 165/18; 126/270
[51] Int. Cl.² .......................................... F24D 11/00
[58] Field of Search ................... 126/270, 271, 400; 237/1 A; 165/18

[56] References Cited
UNITED STATES PATENTS

| 965,391 | 7/1910 | Little | 237/1 A |
|---|---|---|---|
| 1,889,238 | 11/1932 | Clark | 126/271 |
| 2,680,437 | 6/1954 | Miller | 126/270 |
| 2,680,565 | 6/1954 | Lof | 126/271 X |

OTHER PUBLICATIONS

"Fully Solar–Heated House," *Air Conditioning, Heating and Ventilating,* Oct. 1955, pp. 92–97.
"Solar Energy Heating," *Mechanical Engineering,* Feb. 1950, pp. 153–155.

*Primary Examiner*—Kenneth W. Sprague
*Assistant Examiner*—James C. Yeung
*Attorney, Agent, or Firm*—Burton, Crandell & Polumbus

[57] ABSTRACT

A self-contained apparatus for collecting, storing and transmitting solar heat includes an elongated insulated housing in which a quantity of heat retaining material is confined and a collector on one face of the housing which has a multi-layered glass face through which solar heat may pass and be collected upon a unique heat-collecting bed which is insulated from the ambient environment by the glass face. Conditioning pump means are provided within the housing to circulate conditioning air through the collector and the heat retaining material in the housing so that heat is transferred from the collector to the material in the housing. Specially designed and positioned ducts connect the collector to the interior of the housing in a manner such that air interchange between the collector and the interior of the housing is prevented except during operation of the conditioning pump. Both the collector and the interior of the housing are provided with appropriately positioned baffles to optimally expose the conditioning air to the heat collecting bed and to the heat retaining material in the housing. Reflective solar amplifiers are pivotally connected to the housing in a manner such that they are movable from an open operative position wherein they reflect solar radiation into the collector and a closed protective position overlying the glass face of the collector. Utility pump means are also provided in the apparatus for withdrawing air from the interior of the housing and circulating it through a building structure to be heated thereby.

The method of collecting, storing and transmitting solar heat includes the steps of absorbing solar heat on a collector surface wherein the collector surface is insulated from the ambient environment, passing air across the collector surface in a heat transfer process whereby the heat absorbed by the collector surface is transferred to the air, passing the hot air leaving the collector surface through a horizontal duct disposed at a lower elevation than the collector surface, and passing the hot air flowing from the duct into an elevated storage chamber containing material with heat absorbent and heat retaining characteristics whereby the heat in the hot air is transferred from the hot air to the material and retained by said material until it is removed therefrom by a relatively cool air flow.

4 Claims, 27 Drawing Figures

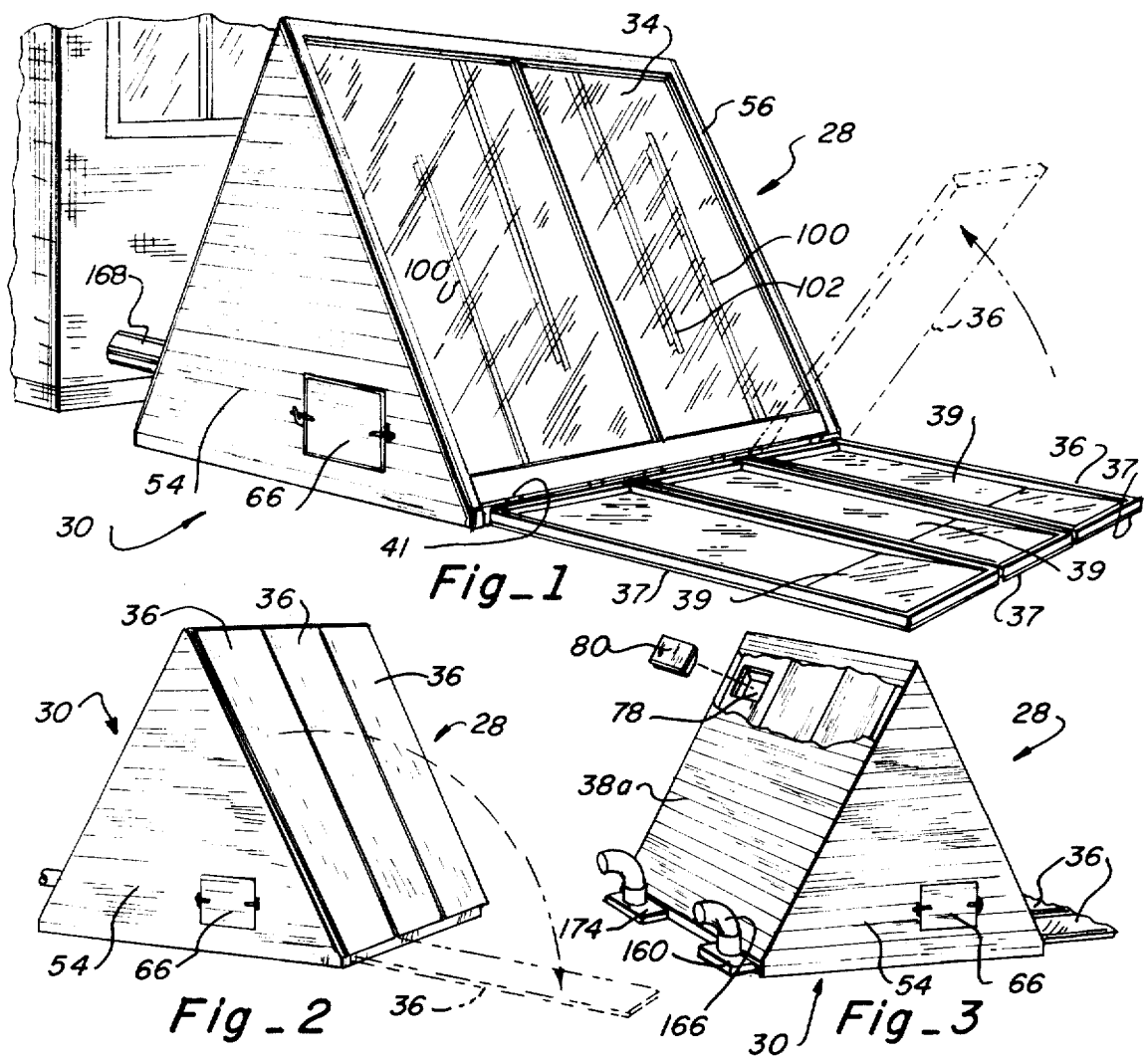
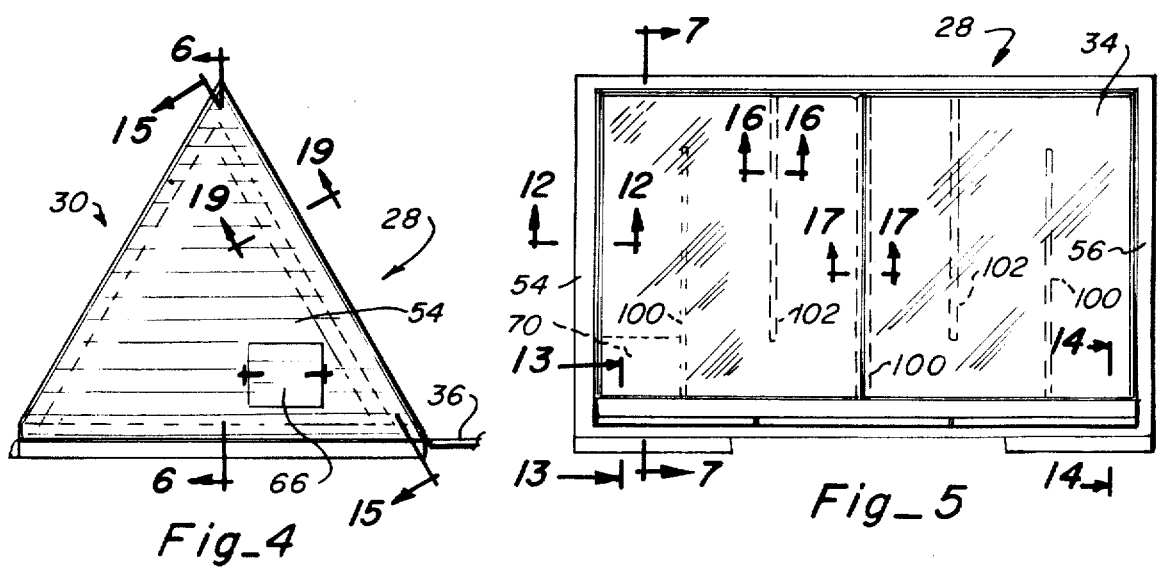

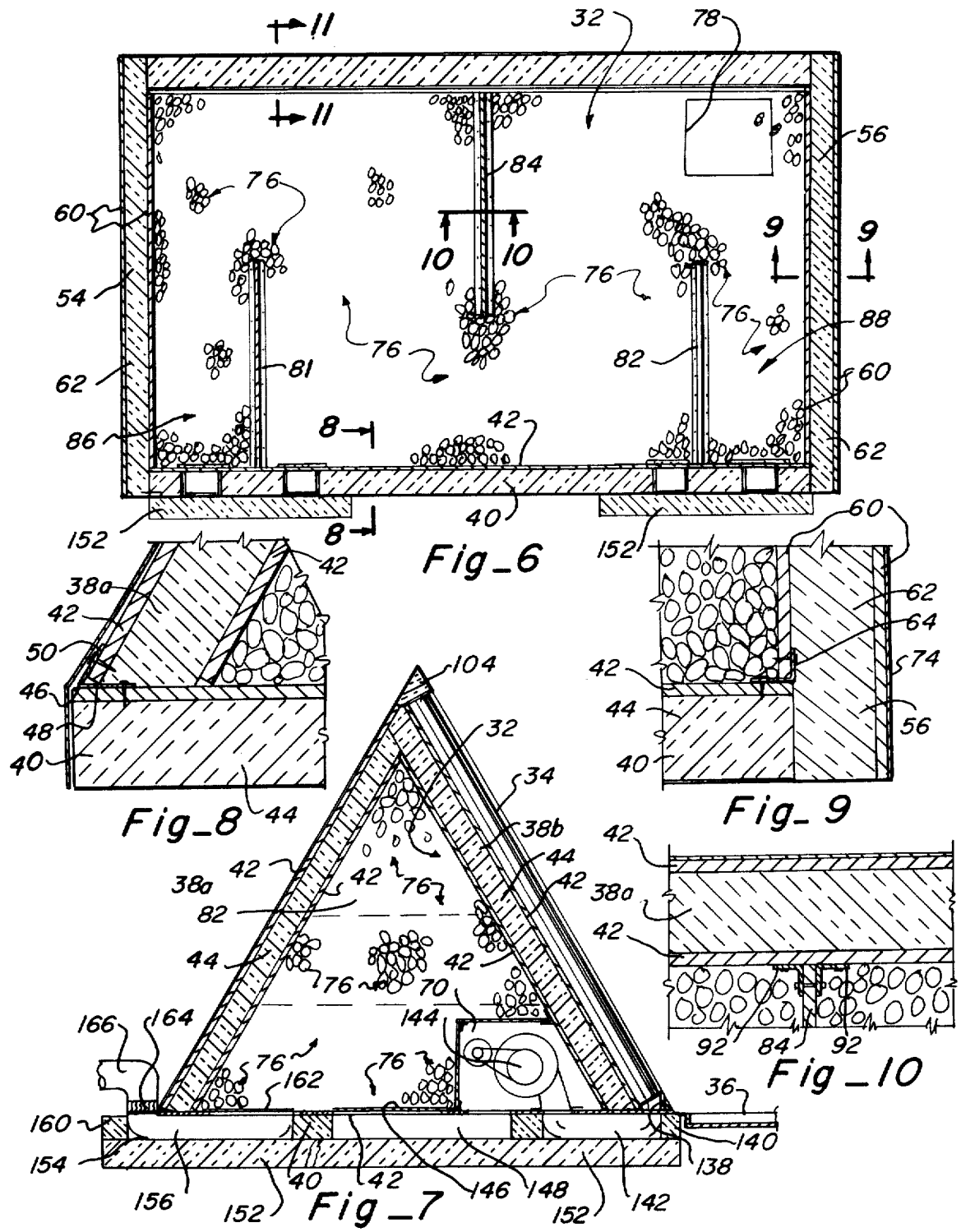

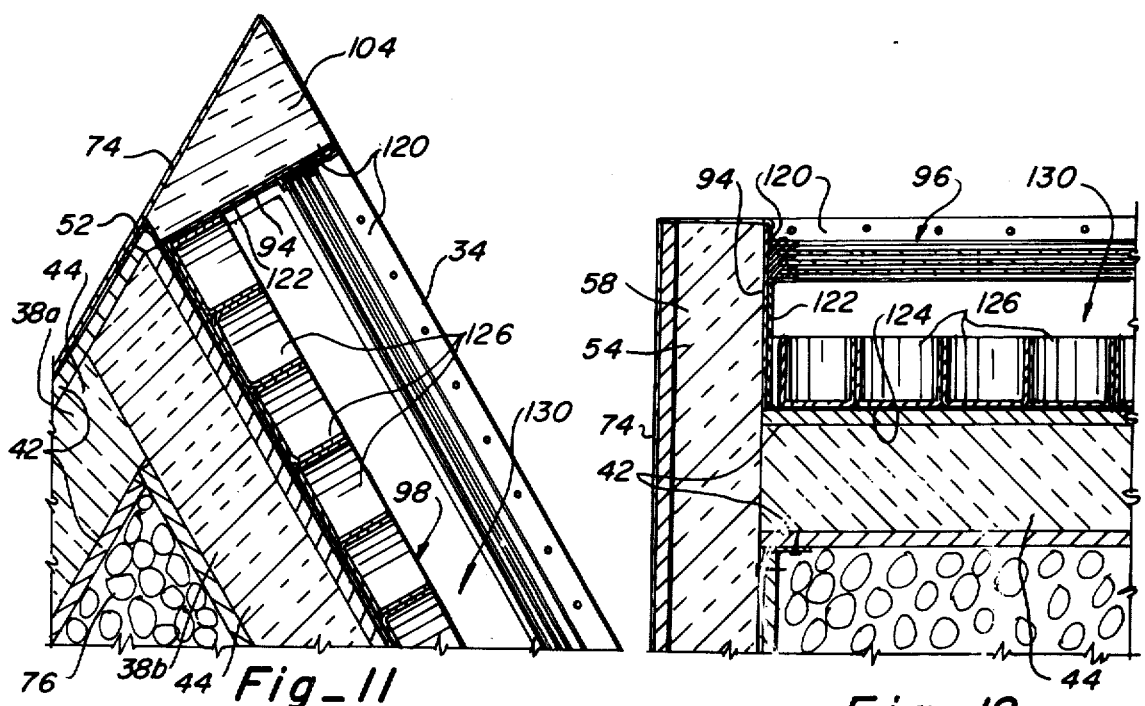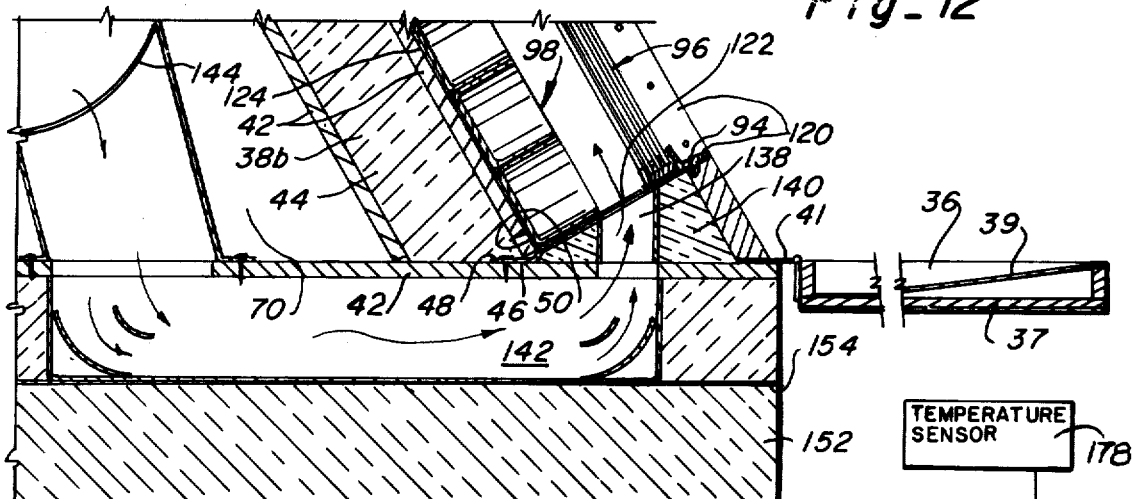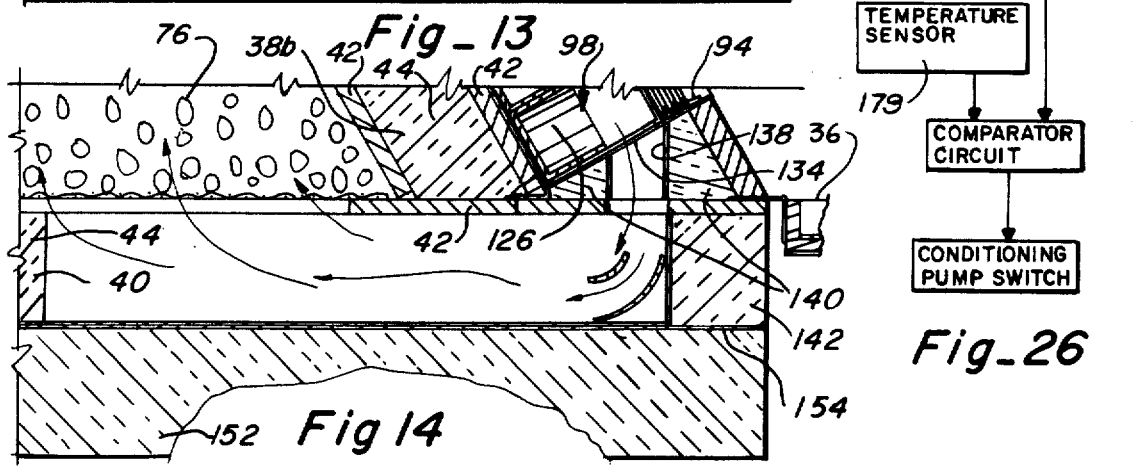

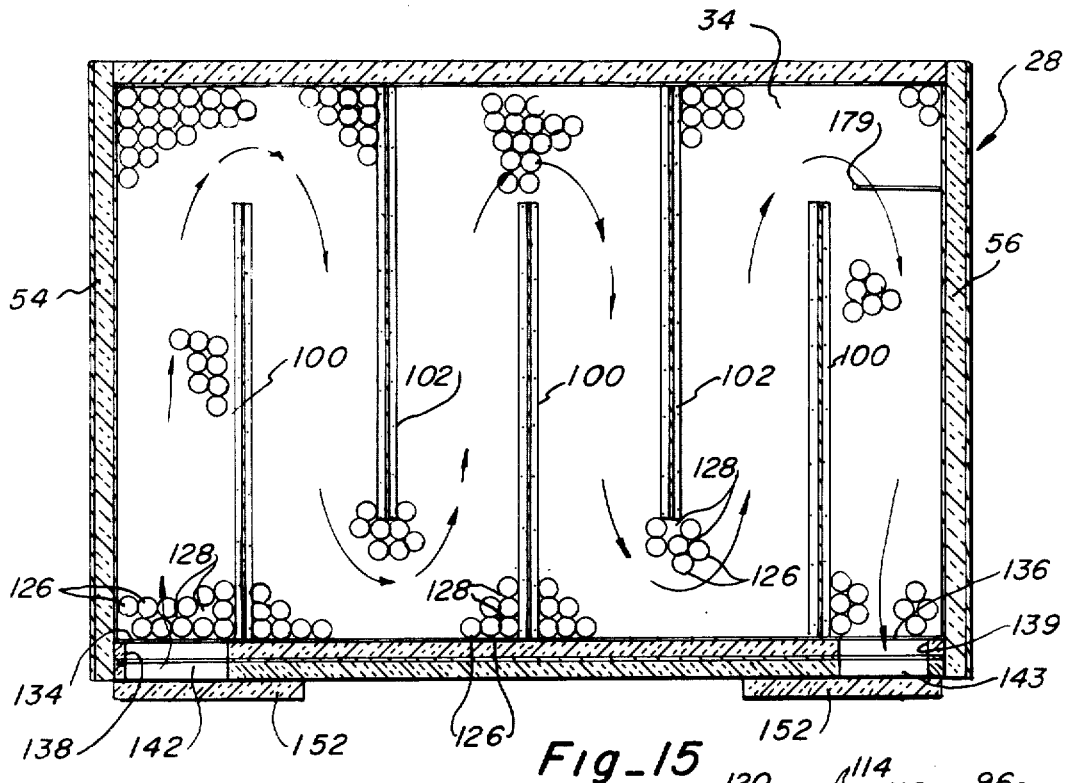
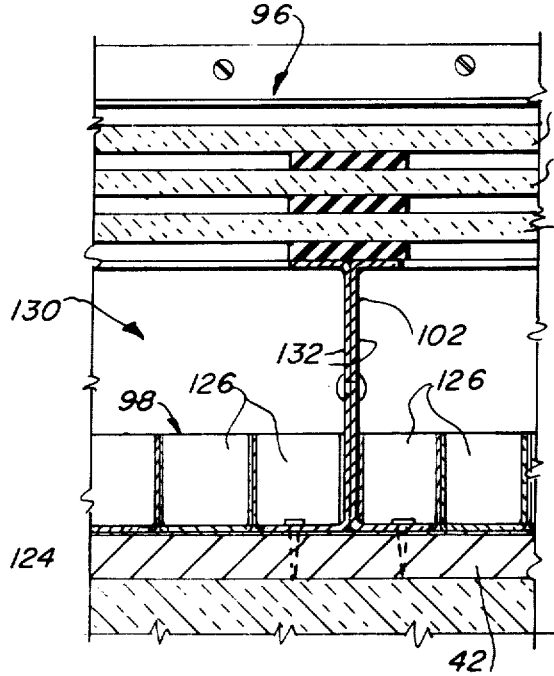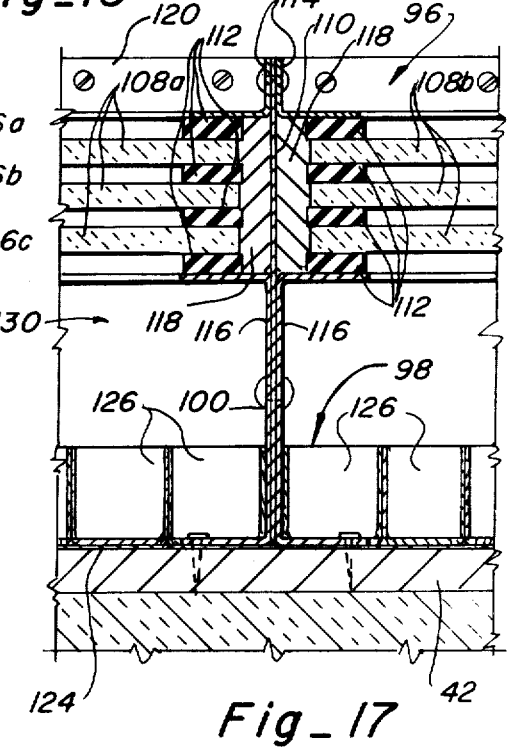

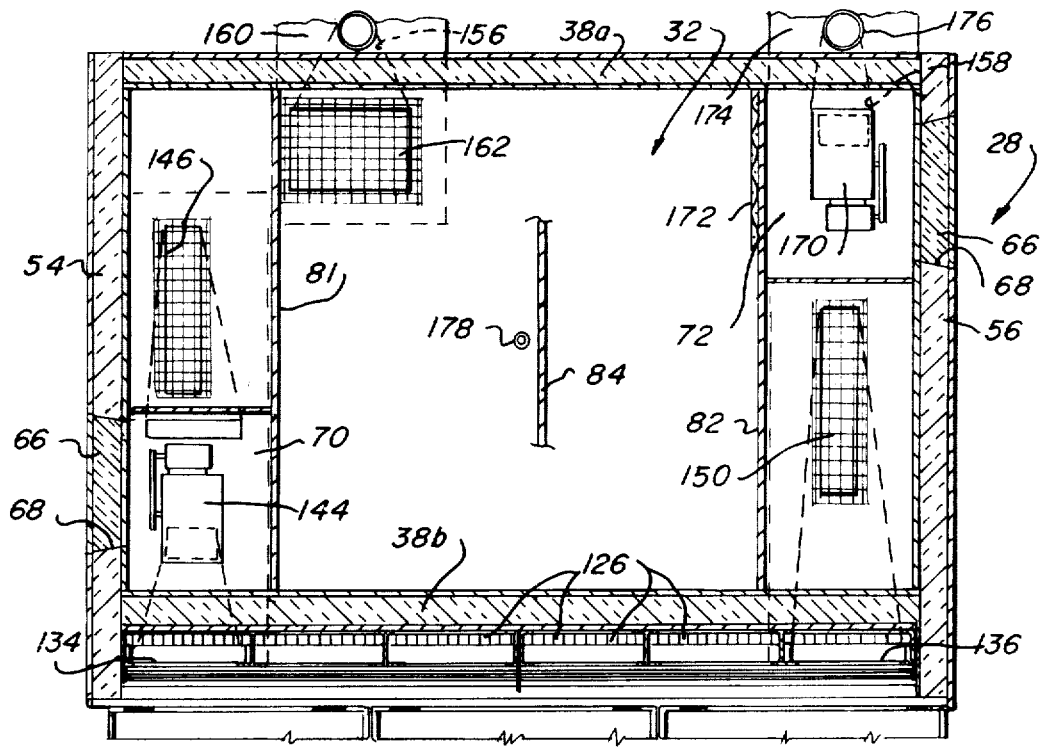
Fig_18
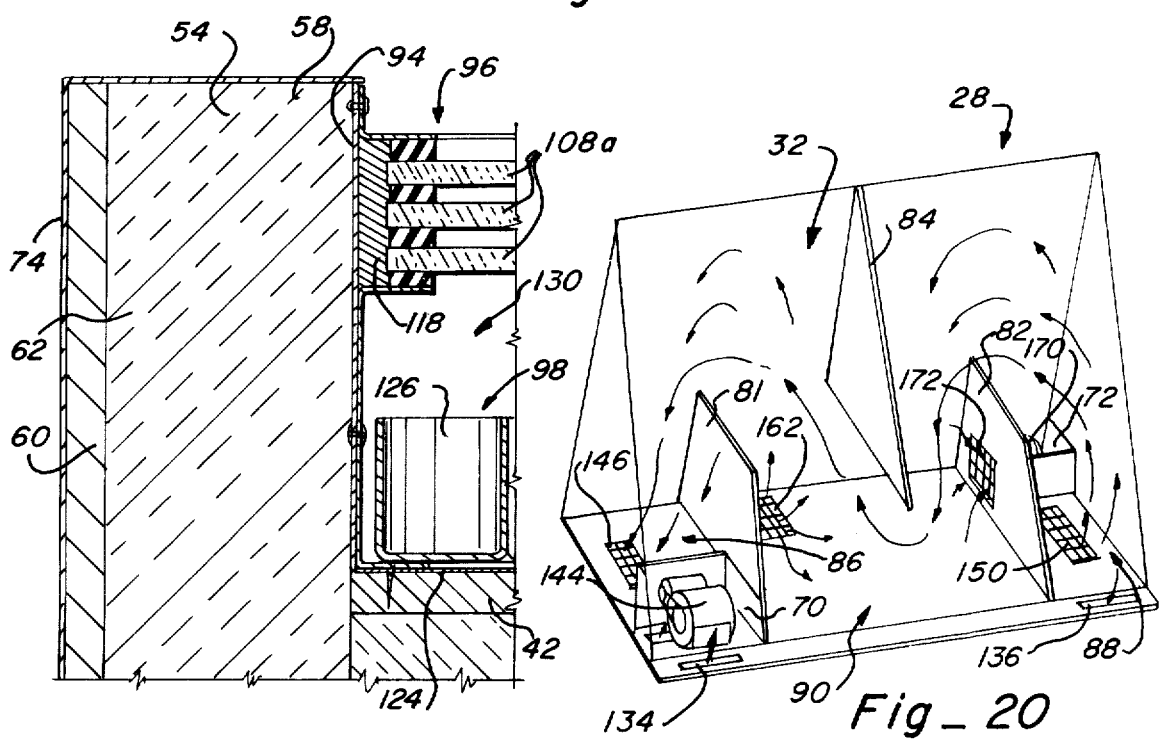
Fig_19
Fig_20

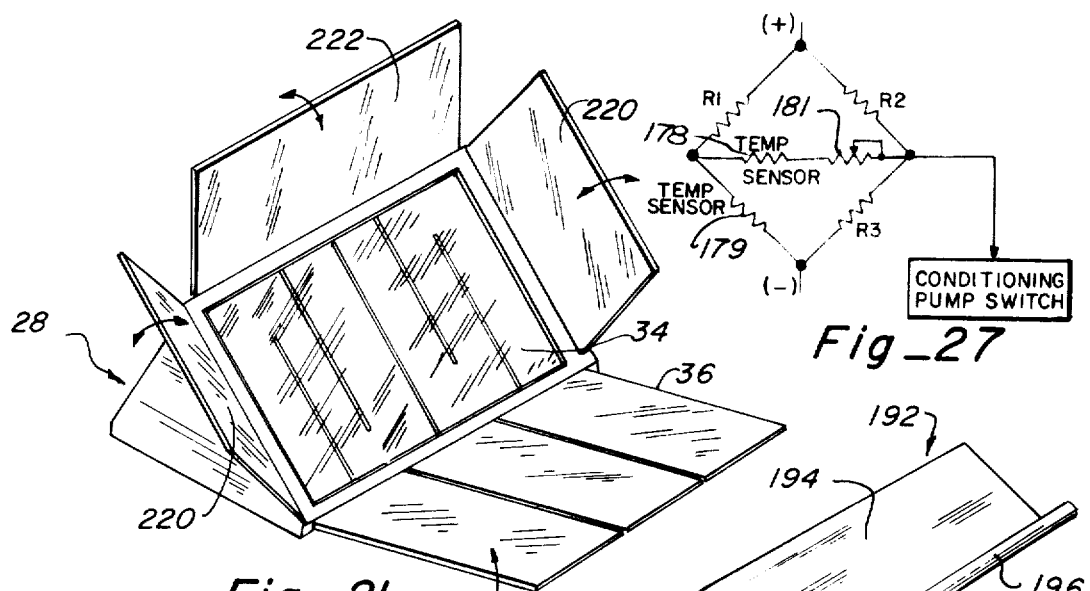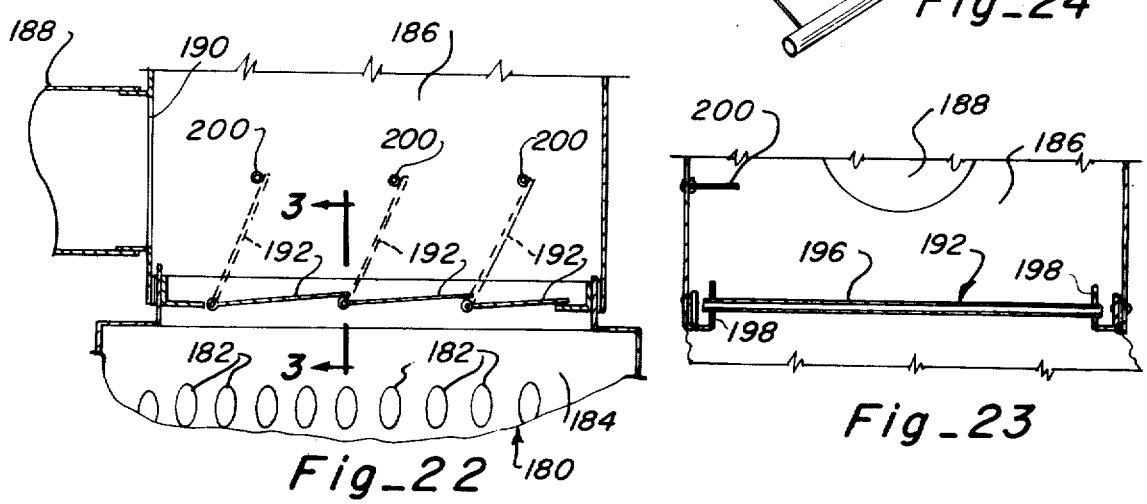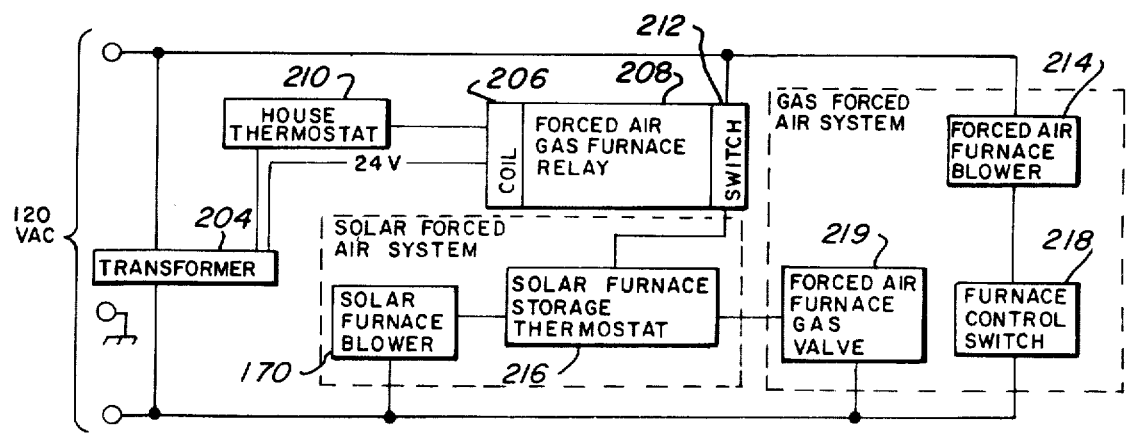

METHOD OF HEATING A BUILDING STRUCTURE WITH SOLAR HEAT

REFERENCE TO RELATED APPLICATIONS

This application is a division of application Ser. No. 445,473 filed Feb. 25, 1974.

BACKGROUND OF THE INVENTION

1. Field of the Invention

The present invention relates generally to a method and apparatus of collecting, storing and transmitting solar heat and more particularly relates to a method and apparatus for heating building structures and the like.

2. Description of the Prior Art

The tremendous energy output of the sun has been recognized for many years and numerous attempts have been made at harnassing this energy so that it can be converted into a useful state. For example, the sun's energy has been successfully converted into electrical energy with solar batteries and similarly, the sun's energy has been converted into heating systems by so-called solar stoves, furnaces and the like. The solar furnace apparatusses, however, have been typified by extremely large collector plates covering large portions of the roof sructure of a building to be heated with the apparatus and large storage chambers usually in the substructure of the building wherein the heat is stored after having been transferred from the collector by a liquid fluid medium. The heat in the storage chamber is then circulated through the building structure by a separate fluid flow.

These systems, which have not only been unwieldly and very expensive to install, have proven to be very inefficient in that there is an excessive heat loss when transferring the solar heat from the collector to the removed storage chamber. Furthermore, these systems have not been capable of being easily installed in existing building structures and have not been devised to cooperate as an auxiliary heating unit to the conventional forced air heating systems commonly found in building structures.

Typical examples of prior art solar heating systems may be found in the June, 1973 and October, 1973 issues of Popular Mechanics magazine and in the May, 1973 issue of Popular Science magazine.

OBJECTS OF THE INVENTION

The present invention has for its primary object the provision of a new and improved method and apparatus for collecting, storing and transmitting solar heat.

It is another object of the present invention to provide a compact, self-contained solar heating unit which can be positioned exteriorly of a building structure and with minimum time and expense connected to the building structure so as to convert solar radiation into heat for maintaining a desired temperature within the building structure.

It is another object of the present invention to provide a new and improved solar heating system which is readily connected into an existing forced air heating system so as to serve as an auxiliary heating system with minimum alteration to an existing building structure.

It is still another object of the present invention to provide a new and improved solar heating system which can also serve as a cooling system with minimal physical or mechanical alterations.

It is another object of the present invention to provide a solar heating unit which utilizes a small and compact heat collector yet has the capacity for adequately heating typical residential building structures.

It is another object of the present invention to provide a solar heating apparatus having a reflective panel to increase captured solar radiation and which can also serve as a protective covering for the collector portion of the apparatus in inclement weather conditions.

It is another object of the present invention to provide a solar heating method and apparatus wherein conventional valve means between a collector and storage chamber of the apparatus are eliminated through the unique positioning and types of air transfer ducts and baffles.

It is another object of the present invention to provide a hot air solar furnace in which baffle members are positioned on the collector and in the heat storage chamber to desirably circulate air in obtaining optimum temperature outputs from the unit.

It is another object of the present invention to provide a hot air solar furnace in which air is transferred from a solar heat collector to a storage chamber with a minimum of heat loss and removed from the storage chamber and transmitted into a building structure with a minimum heat loss.

It is another object of the present invention to provide a hot air solar furnace which has above ground heat storage eliminating the need for costly and disfiguring excavation.

It is another object of the present invention to provide means to containerize heat storage with a new and simplified framing technique.

SUMMARY OF THE INVENTION

The foregoing and other objects are obtained in accordance with the present invention whereby solar heat is collected and stored in an integrated compact unit which is capable of generating a heat flow equal to or surpassing those of much larger unwielding units which have been typical of prior art solar heating units. The solar heating apparatus of the present invention is self-contained in an elongated housing preferably of triangular transverse cross-sectional configuration. This configuration has been found to allow a maximum quantity of heat retaining material, such as gravel, to be stored in the apparatus with a minimum of structural reinforcement. The housing is basically constructed of two rectangular top panels, a rectangular bottom panel, and two triangular end panels which are interconnected to define an enclosed storage chamber for the heat retaining material. The panels are each laminated in such a manner as to give both structural strength and the required insulating qualities for maintaining the temperatures of the heat retaining material in the storage chamber. A collector unit is mounted upon one of the top panels of the housing so as to be inclined relative to the vertical in a position to receive the maximum heat from the Winter sun.

The collector unit is uniquely designed to absorb solar radiated heat and retain the heat by converting the heat waves, which will readily pass through transparent glass or plastic panes on the collector face, into long wave heat radiation which will not readily pass back through the glass or plastic panes on the face of the collector. The solar heat is absorbed on a base panel of the collector which emits relatively long wave heat radiation that becomes trapped in the collector.

The base panel of the collector has a plurality of forwardly opening cups which serve to increase the heat absorption and emission capability of the collector. Depending upon the material from which the cups are made, they usually will not retain the heat imparted thereto by the solar radiation for extended periods of time; accordingly, air is circulated through the collector to transfer the heat absorbed by the cups into the storage chamber of the apparatus wherein the gravel material not only absorbs the heat carried by the air but also retains the heat for extended periods of time due to inherent heat retaining characteristics of gravel and its inherent restriction of convection. The air which passes through the collector and into the storage chamber is re-circulated through the collector so as to continuously transfer heat, when desired, from the collector to the storage unit. For purposes of the present disclosure, this circulating air will be referred to as conditioning air. Since it is important to the optimum operation of the unit that the conditioning air be equally exposed to the entire base of the collector, a series of baffles are provided in the collector to direct the air stream through a series of reversing bends. Similarly, baffles are provided in the storage chamber to direct the conditioning air throughout the entire quantity of gravel in the storage chamber.

A conditioning air pump is positioned within the storage chamber to effect the desired conditioning air flow. The air is passed from the storage chamber to the collector and back into the storage chamber through inlet and outlet ducts which are positioned at an elevation below both the storage chamber and the collector so that when the pump is not in operation, the hot air which is lighter than cold air, and therefore urged to the top of the respective components of the apparatus, will not be able to freely flow between the components so that the ducts establish thermal traps that avoid the necessity of relatively expensive valve means to accomplish the same purpose.

A reflector panel is hinged to the framework of the housing along an edge of the collector unit so that by opening the reflective panel, the solar heat radiation being absorbed by the collector unit is increased. This reflective panel is designed so that in a closed position it overlies the collector unit and thereby protects the relatively fragile glass from detrimental environmental elements such as hail, sunlight in Summer months, and the like.

The heat retained by the heat retaining material in the storage chamber is transferred into an adjacent building structure or the like by a utility pump which may also be positioned within the storage chamber and connected to the building structure by suitable insulated duct work having outlets for selectively distributing the hot air through the building structure. This air flow, which will be hereinafter referred to as the utility air flow, is circulated back through the storage chamber in a manner so as to obtain a maximum heat transfer from the heat retaining material to the air and in a manner such that the utility air is not short circuited and directed through the collector with the conditioning air unless both pumps are operating simultaneously. As will be explained in more detail hereinafter, this is accomplished by positioning the inlet and outlet ducts for both the conditioning air circuit and the utility air circuit on appropriate sides of the baffle members within the storage chamber.

As will be more fully appreciated hereinafter, the unit is ideally suited for connection to an existing forced air heating system in a building structure so as to serve as an auxiliary unit to the forced air heating system even though in many instances, the solar heating unit is sufficient in itself to provide the necessary heat for the building structure.

According to the method of the present invention, heat is first absorbed from the sun on a collector surface wherein the collector surface is insulated from the ambient environment and internal air is passed across the collector surface in a heat transfer process so that the heat absorbed by the collector surface is transferred to the internal air. The air is then passed through a duct which is lower than the collector surface into a raised storage chamber wherein it is directed through heat absorbent and heat retaining material in the storage chamber so that the heat in the hot air is transferred to the material in the storage chamber. The heat retained by the material in the storage chamber is transferred into a building structure by directing a utility stream of air through the material in the storage chamber and into the building structure wherein it is distributed as desired throughout the structure.

Other objects, advantages and capabilities of the present invention will become more apparent as the description proceeds taken in conjunction with the accompanying drawings.

DESCRIPTION OF THE DRAWINGS

FIG. 1 is a perspective view of the solar heating apparatus of the present invention with the reflector panel shown in an open position.

FIG. 2 is a perspective view of the solar heating unit of FIG. 1 with the reflector panel in a closed position.

FIG. 3 is a perspective view of the solar heating unit of the present invention as viewed from the reverse side of FIG. 1.

FIG. 4 is an end elevation of the solar heating unit of FIG. 1.

FIG. 5 is a side elevation of the solar heating unit of FIG. 1 showing the collector unit.

FIG. 6 is an enlarged vertical section taken along line 6—6 of FIG. 4.

FIG. 7 is an enlarged vertical section taken along line 7—7 of FIG. 5.

FIG. 8 is an enlarged fragmentary vertical section illustrating the connection of a top panel of the solar heating unit to the bottom panel.

FIG. 9 is an enlarged fragmentary section illustrating the connection of an end panel of the solar heating unit to the bottom panel.

FIG. 10 is a section taken along line 10—10 of FIG. 6.

FIG. 11 is an enlarged fragmentary vertical section taken along line 11—11 of FIG. 6.

FIG. 12 is an enlarged section taken along line 12—12 of FIG. 5.

FIG. 13 is a vertical section taken along line 13—13 of FIG. 5.

FIG. 14 is a vertical section taken along line 14—14 of FIG. 5.

FIG. 15 is a section taken along line 15—15 of FIG. 4.

FIG. 16 is a section taken along line 16—16 of FIG. 5.

FIG. 17 is a section taken along line 17—17 of FIG. 5.

FIG. 18 is a diagrammatic horizontal section illustrating the floor plan of the solar heating apparatus of the present invention.

FIG. 19 is an enlarged section taken along line 19—19 of FIG. 4.

FIG. 20 is a diagrammatic perspective view illustrating the air currents through the storage chamber of the solar heating apparatus of the present invention.

FIG. 21 is a diagrammatic perspective view showing a modified form of the solar heating unit of the present invention.

FIG. 22 is an enlarged vertical section taken through an upper portion of a forced air furnace illustrating the connection of the solar heating apparatus of the present invention to the forced air furnace.

FIG. 23 is a section taken along line 23—23 of FIG. 22.

FIG. 24 is a perspective view of a valve plate shown in FIGS. 22 and 23.

FIG. 25 is a circuit diagram of the connection of the solar heating apparatus of the present invention to a conventional forced air furnace system.

FIG. 26 is a diagrammatic representation of the dual switch control for the conditioning pump of the apparatus of the present invention.

FIG. 27 is an electrical schematic of the dual switch control of FIG. 26.

DESCRIPTION OF THE PREFERRED EMBODIMENTS

The solar heating apparatus 28 of the present invention includes a housing 30 defining an internal storage chamber 32, a collector unit 34 mounted upon one face of the housing 30, and a reflector panel 36 pivotally connected to the housing so as to be movable between an open position exposing the collector unit 34 to the ambient environment and a closed protective position overlying the collector unit.

The framework for the apparatus includes three insulating rectangular panels of substantially the same size which are interconnected along their longitudinal edges to form an elongated housing of triangular transverse cross-section. The three rectangular panels consist of two inclined top panels 38a and 38b and a floor panel 40 with the top panels 38a and 38b forming an angle of approximately 60° with horizontal. Each of the top panels and bottom panel are laminated with conventional plywood sheets 42 on opposite faces and an inner relatively thick core 44 of an insulating material such as a rigid polyurethane foam. The plywood panels are preferably painted or coated with a reflective paint such as a silver paint to better retain heat within the storage chamber.

The panels 38a, 38b, and 40 are connected along their edges with a relatively thin gauge angled metallic strip which is positioned to be self-tightening. Referring to FIG. 8, it will be seen that the lower edge of each top panel is tapered to fit flush against the horizontal top surface of the bottom panel 40 and an angled metallic strip 46, FIGS. 8 and 13, is positioned along the outer edge of the top and bottom panels 38a and 38b so as to have a horizontal leg 48 which lies between the panels and an upwardly inclined leg 50 which is flush with the outer surface of the top panel. Conventional fasteners, such as of the screw type, connect the horizontal leg with the bottom panel and the upwardly inclined leg with the top panel. These fastening strips 46 extend along the length of the bottom of the panels to securely and reliably interconnect the panels. The bottom panel extends beyond the lower edge of the top panel 38b for a reason which will become clear later.

At the juncture of the upper edges of the top panels 38a and 38b, one of the top panels 38a extends across the upper end of the other top panel 38b and is bevelled at its outer end so as to form a 60° angle therewith and establish a smooth juncture of the two panels. The plywood laminate 42 on the outer surface of each of the top panels extends upwardly to the uppermost point of the housing and an angle iron strip 52 is placed downwardly over the juncture of the two outermost plywood sheets to extend along the length of the panels. This angle iron strip 52 is suitably fastened to the respective top panels, such as with screw type fasteners, to reliably secure the panels along the top edges thereof.

Triangular shaped end panels 54 and 56 are secured to the end edges of the top and bottom panels 38a and 38b of the housing in a manner which is best illustrated in FIG. 9. There it will be seen that the end panels 54 and 56 extend downwardly to the lower edge of the bottom panel 40 and likewise extend outwardly to the outer edges of the top panels 38a and 38b to completely cover the end edges of the top and bottom panels. The end panels actually extend beyond the top panel 38b at 58, FIGS. 12 and 19, for a purpose to be described later. The end panels are constructed identically to the top and bottom panels in that they are laminates having outer layers 60 of a rigid material such as plywood and an inner insulating rigid foam core 62. The end panels are connected to the top and bottom panels by angled metallic strips 64, FIG. 9, which extend along the junctures of the panels and are fastened thereto as with screw-type fasteners in a self-tightening manner. Each end panel has a removable door 66 closing an opening 68 therein which provides selectable access to pump containing compartments 70 and 72 in the storage chamber 32 which will be described later.

A water-repellent sheet metal covering 74 is provided over the top panel 38a and the end panels 54 and 56 so that these panels will be protected from deterioration by moisture in the ambient environment.

The top, bottom and end panels cooperate in confining a heat retaining material 76 such as gravel in a manner such that the weight of the gravel does not place excessive outward pressure on the housing. In other words, since gravel is naturally piled with inclining sides, the pressure on the top walls 38a and 38b of the housing, since they too are inclined, is minimal. In the preferred form, the heat retaining material 76 is a granite rock of approximately 1½ inches in diameter so that the spaces between the rock particles are sufficient to allow the flow of air through the storage chamber. A fill opening 78, FIGS. 3 and 6, is provided near the top edge of one of the top panels so that gravel can be poured through the opening to fill the storage chamber. An insulated door 80 removably seals the opening 78 during operation of the apparatus.

The storage chamber 32 of the apparatus has a plurality of baffles or barrier plates 81, 82 and 84 positioned therein to encourage the desired circulation of air through the gravel material as will be described in more particularity later. The baffle members include two upstanding baffle members 81 and 82 of trapezoidal configuration which are flush with the bottom wall and extend slightly over half the height of each of the top panels thereby separating the lower portion of the storage chamber into two end sections 86 and 88 and a central section 90, FIGS. 6 and 20. The third depending baffle member 84 is suspended from the upper portion of the top panel members at approximately their longitudinal center and is of triangular configuration to fit flushly against the inner surfaces of the top panel members and extend slightly over half the height of the top panel members so as to overlap the upward extent of the upstanding baffles. Each of the baffle members is secured to the abutting top and bottom panel members by suitable fasteners 92, FIG. 10, which could be angle iron strips.

The reflector panel 36 in the preferred form includes a framework 37 in which three highly reflective sheets 39 of aluminum or the like are retained. The sheets may follow a modified parabolic curve to concentrate solar radiation on the collector unit 34. The framework 37 is pivotally mounted as by a hinge 41 to the floor panel 40 of the apparatus. The reflective sheets, of course, could be other suitable materials such as mirrors, or the like, and if the mirrors were readily susceptible to breakage, a large number of relatively small mirrors could be mounted in the framework 37 so that replacement of damaged or broken mirrors would not be a great economical burden.

The collector unit 34 which is probably best illustrated in FIGS. 1, 5, 7 and 11–14, is of a size substantially the same as the top panels of the housing and is mounted directly on the outer face of the top panels 38b. The collector unit includes an outer peripheral rigid frame 94, a front insulating glass portion 96, and a back heat accumulator portion 98. The insulator glass portion and heat accumulator portion are separated by a plurality of baffle members 100 and 102 which, as will be explained hereinafter, serve to circulate air uniformly through the collector.

The peripheral frame 94 abuts the inner surfaces of the extensions 58 of the end panels beyond top panel 38b so as to be insulated along the associated two sides from the ambient environment and an elongated wedge shaped insulating block 104 lies across and is attached to the top portion of the peripheral frame to insulate the top portion from the ambient environment.

The insulating glass portion 96 of the collector unit consists, in the preferred form, of three spaced layers 106a, 106b and 106c of glass with each layer of glass having two coplanar glass or plastic panels 108a and 108b separated at the longitudinal center of the collector by a center plate 110. Each glass or plastic panel is separated from the glass panel in the next adjacent layer by a rubber sealant strip 112 which extends around the periphery of the panel. Referring to FIG. 17, the rubber sealant strips extending along the adjacent ends of the glass panels at the longitudinal center of the collector are seen sandwiched with the glass panels between an outer angle iron strip 114 which is secured as by a rivet to the center plate 110 and an inner channel member 116 which is also secured to the center plate as by a rivet. The periphery of each glass panel is embedded along with the rubber sealant strips 112 in a caulking compound 118, FIG. 17, to hermetically seal the perimeter of the insulating glass portion of the collector so that heat accumulated in the heat accumulator portion of the collector cannot escape back to the ambient environment around the periphery of the glass panels. In FIGS. 11–13, the top, bottom and side edges respectively of the glass panels are seen similarly sandwiched between an outer angle iron strip 120 and an inner channel member 122 each of which are affixed in any suitable manner to the outer frame 94 of the collector unit. Accordingly, the glass panels 108a and 108b on each half of the glass insulating portion of the collector unit are retained in parallel spaced relationship and are sealed around their periphery to prevent heat loss.

The heat accumulator portion 98 of the collector unit includes a planar back plate 124, preferably a sheet of black coated metallic coil or the like which lies against or is affixed to the outer plywood sheet 42 of the top panel 38b. A plurality of forwardly opening cups 126, preferably of cylindrical configuration and made of aluminum and coated black, are positioned upon the black aluminum back sheet and define spaces 128 therebetween which expose the back sheet 124. Again, preferably the cups are coated or annodized in a black color as black is known to be the best heat absorbent color. The cups may be loosely disposed upon the back plate 124 or could be secured thereto if desired. It will be appreciated that the cups enlarge the surface area of the heat accumulator 98 and thus the solar thermal energy capturing ability of the apparatus. In fact, by using cups which are approximately 2 inches in length and 2¾ inches in diameter, the surface area of the heat accumulator will be increased approximately 4.75 times over that of a planar heat accumulator. As clearly seen in FIGS. 11–13, the forward extent of the accumulator cups 126 is rearwardly spaced from the insulator glass 96 defining an open space or passage 130 therebetween through which air can freely pass. The baffle members 100 and 102 are positioned within this space to direct the conditioning air currents along a predetermined path which fairly uniformly covers the entire array or matrix of accumulator cups whereby a complete and effective transfer of heat from the accumulator cups to the air can be effected.

As best illustrated in FIG. 15, in the preferred form, there are three rising baffle members 100 which extend upwardly from the lower edge of the collector unit in uniformly spaced relationship and two depending baffle members 102 which extend downwardly from the top edge of the collector unit into the centralmost spaces between the three rising baffle members. Each of the baffle members extend approximately ¾ of the height of the collector. Referring to FIGS. 16 and 17, these baffle members can be seen to be comprised of the back-to-back channel members 132 and 116 with the channel members 116 on the center baffle 100 being those at the longitudinal center of the collector unit which support the adjacent center edges of the glass panels 108a and 108b. The remaining baffle members, as shown in FIG. 15, serve to support the glass panels and additional rubber spacer sealant strips at intermediate locations so that the glass insulating portion 96 of the collector unit is adequately supported and less prone to damage. Of course, each of the baffles are secured to the back plate and the underlying plywood sheet of the top panel by suitable fasteners.

Referring now to FIGS. 13–15 and 20, it will be seen that the lower horizontal portion of the frame 94 of the collecor unit has rectangular openings 134 and 136 at opposite ends thereof which communicate with the space 130 between the glass insulator section and the heat accumulator section of the unit. The opening 134 is the inlet opening to the collector while the opening 136 is the outlet opening. Air entering the collector through the inlet opening 134 is confined in the space 130 between the glass insulator portion 96 and heat accumulator portion 98 and is directed along a path defined by the baffle members which passes through a series of reversing bends as indicated by the arrows in FIG. 15, thereby forcing the air to pass across all of the accumulator cups in the collector. Turbulence created by the configuration and positioning of the cups assists in the more efficient transfer of heat.

Referring now to FIGS. 7, and 13–15, it will be seen that the inlet and outlet openings 134 and 136 respectively of the collector unit are connected through rectangular passages 138 and 139 in an insulating foam block 140 to insulated ducts 142 and 143 which are cut or otherwise formed in the floor panel 40 of the housing. The ducts 142 and 143 open into the storage chamber 32 of the apparatus. The duct 142 communicating with the inlet opening 134 of the collector unit is in fluid communication with a conditioning air pump 144 mounted within the enclosed compartment 70 in the storage chamber. The pump 144 is also in fluid communication with an outlet 146 from the storage chamber via a duct 148. The ducts 143 and 148 each have screens covering their openings into the storage chamber 32 and each screen has a mesh size less than the size of the rock material stored in the storage chamber so that the rock material cannot pass into the ducts. The screened opening 150 connecting the duct 143 to the storage chamber, will hereafter be referred to as the conditioning air inlet to the storage chamber while the screened opening 146 will be referred to as the conditioning air outlet from the storage chamber.

It will, therefore, be seen that a circulating path is established through the collector and the storage chamber with the conditioning air pump serving as the means for effecting the desired circulation of the conditioning air. The conditioning air pump draws the air from the storage chamber through the duct 148 which again is cut or otherwise formed in the bottom panel of the housing so as to be at a level beneath both the collector and storage chamber and open into the conditioning air pump compartment as well as into the end section 86 of the remaining open area of the storage chamber so that air which has passed through the storage chamber is drawn downwardly into the duct 148 before being passed through the conditioning air pump and subsequently into the collector unit. The purpose for the three under-the-floor ducts 142, 143 and 148, is to prevent the free flow of air between the spaces connected by the ducts eliminating the need for conventional fluid flow valves.

It is important that once the heat has been transferred from the collector into the storage chamber that it not be allowed to escape from the chamber by convection during non-operation of the circulating pump. Since hot air rises to the top of the storage chamber and will not pass downwardly through any of the ducts connecting the storage chamber to the collector unit and thereby allow heat to escape from the storage chamber. Accordingly, by placing the ducts at a level beneath both the storage chamber and the collector unit, the hot air is prevented from escaping from the storage chamber and the use of conventional and relatively expensive valves are avoided. To insulate the ducts from the underlying terrain on which the apparatus is supported, insulated pads 152 are positioned beneath the ducts, even though a complete insulating panel approximately the size of the bottom panel could be used. Preferably, a vapor barrier 154 in the form of a corregated metal or plastic sheet would separate the insulating panel from the bottom panel and the ducts to prevent the ingress of moisture.

The flow of conditioning air through the storage chamber of the apparatus is best illustrated in FIG. 20 wherein it is seen that hot air leaving the collector unit through the outlet opening 136 emerges through the screened opening 150 at the inlet end of the storage chamber and is forced to pass unwardly over the baffle member 82 into the heat retaining gravel and then follow a downwardly and upwardly reversing path below and above the three baffle plates 80, 82 and 84 in the storage chamber until it is drawn downwardly through the screened outlet opening 146 at the opposite end of the storage chamber and subsequently blown by the conditioning pump into the collector unit through the inlet opening 134. In this manner, the hot air being directed into the storage chamber from the collector unit is forced to pass through the storage chamber in such a manner as to come into contact with substantially all of the heat retaining gravel material in the storage chamber. It should be realized that the inlet end of the storage chamber will normally be substantially hotter than the outlet end during operation of the conditioning pump since the hot air entering the storage chamber will lose its heat to the gravel material as it passes through the storage chamber (provided that circulated air temperature is higher than storage temperature) so that by the time the air reaches the outlet end of the storage chamber it is somewhat cooler than when it entered the storage chamber.

In addition to the three aforedescribed under-the-floor ducts 142, 143 and 148, the apparatus has two additional under-the-floor ducts 156 and 158 defining inlet and outlet ducts respectively of the utility air circuit so that the heat retained by the material in the storage chamber can be transferred via a flow of utility air through an adjacent building structure. The inlet duct 156 for the utility air is seen in FIG. 7 to comprise an elongated channel cut or otherwise formed in the floor panel 40 of the apparatus and sealed by an insulating block 160 so as to extend beneath the lower edge of the top panel. The inner end of the inlet duct opens upwardly through the floor of the unit and has a screen 162 covering thereover of a smaller mesh than the particle size of the gravel heat retaining material so as to prevent the gravel material from falling into the duct. The outer end of the duct opens upwardly and extends above the floor of the storage chamber and is connected through a conventional air filter 164 to an elbow conduit 166 which is connected via an air flow conduit 168, FIG. 1, to a circulating duct system in the building structure (not shown). The circulating duct system in the building structure could be an existing forced air furnace duct system and the heating apparatus of the present invention could be connected thereto in a manner to be described in detail later. However, the solar system could have its own circulating duct system.

Similarly, the outlet duct 158 of the utility air circuit is formed in the floor panel the same as the the inlet duct and has its inner end opening upwardly in fluid communication with a utility pump 170, FIGS. 18 and 20, which is housed in the enclosed compartment 72 in the storage chamber at the diametrically opposite corner from the conditioning pump 144. The inlet of the utility pump opens through a screened opening 172 in the adjacent upstanding baffle plate 82 so as to draw air from the central section of the storage chamber. The outlet duct 158 of the utility system also opens at its outer end through an insulated block 174 and may be connected through an air filter (not shown) to a second elbow conduit 176 and subsequently through an air flow conduit (not shown) to the circulating duct work in the building structure. It can, therefore, be appreciated that a circulating utility air flow circuit is established through the storage chamber and the heating duct work in the building structure whereby hot air can be drawn from the storage chamber and blown into the building structure wherein it may be selectively diverted through various vent openings into desired locations in the building structure.

As mentioned previously, the heat retaining gravel material 76 in the storage chamber is hottest at the inlet end of the storage chamber with respect to the conditioning circuit and progressively becomes relatively cooler toward the outlet end. It is, therefore, desirable that the utility air flow, or that air which is directed into the building structure, is withdrawn from the storage chamber at the hot end or the inlet end thereof and for this reason, the utility pump which withdraws air from the storage chamber and directs it into the building structure is positioned at the hot or inlet end in the section 88 of the storage chamber. However, to prevent air entering the storage chamber from the collector unit through opening 150 from being withdrawn directly by the utility pump 170, the inlet 172 to the utility pump is positioned on the opposite side of the upstanding baffle plate 82 from the opening 150 so that the hot air entering the storage chamber is forced to begin circulating and thereby transferring its heat into the gravel material whereby this heat will be retained by the gravel material and can be readily withdrawn when the utility pump is in operation. In other words, by positioning the inlet 172 to the utility pump on the opposite side of the baffle plate 82 from the outlet of the collector, a short circuit in both the utility and conditioning air flows is avoided.

So that the utility air entering the storage chamber will have adequate time to absorb heat from the gravel storage material before it is withdrawn from the storage chamber by the utility pump, it is desirable that the inlet 162 to the storage chamber in the utility circuit be positioned as far away from the utility pump as possible. However, the inlet in the utility circuit is preferably not placed closely adjacent to the outlet 146 from the storage chamber in the conditioning circuit so that the air does not flow directly into the outlet of the conditioning circuit but rather flows toward the utility pump 170 and thus toward the hot end of the storage chamber in a counter-flow direction relative to the conditioning air circuit except when both pumps are in simultaneous operation. For this reason, the inlet 162 of the utility circuit has been positioned on the opposite side of the upstanding baffle plate 80 so that this air will migrate toward the hot end of the apparatus beneath the center baffle plate 84 and will not rise and pass over the upstanding baffle plate 80 and thereafter pass into the outlet 146 of the conditioning circuit. Accordingly, this relative relationship of the inlet 162 in the utility circuit to the outlet 146 in the conditioning circuit prevents short circuiting of the utility air flow and encourages the air to flow in the desired direction.

It should be appreciated that the apparatus is designed so that if desired, the storage chamber can be essentially by passed whereby hot air can be circulated through the collector and the building structure with minimal contact with the heat retaining material. In this manner heat from the collector is transferred substantially directly into the building structure. This can be best understood by reference to FIG. 20 wherein it will be seen that if both the utility pump 170 and the conditioning pump 144 are operated simultaneously, air leaving the collector and entering the storage chamber through opening 150 will pass upwardly over the baffle member 82 and will be immediately drawn into the inlet 172 of the utility pump wherefrom it will be circulated through the duct work in the building structure. In other words, when the hot air enters the storage chamber and passes over the baffle member 82, the low pressure existing at the inlet 172 to the outlet pump during operation of the utility pump attracts the hot air so that it does not take its normal circulating path through the heat retaining material in the storage chamber. After the air has circulated through the duct work in the building structure it enters the storage chamber through inlet 162 and is drawn over baffle member 80 into outlet 146 from the storage chamber whereby it is cycled into the conditioning pump 144 and into the collector through the inlet 134 to the collector. Thus it will be seen that a closed circulating path directly connecting the collector to the duct work in the building structure, with minimal contact with the heat retaining material 76, is established by simultaneous operation of the conditioning and utility pumps.

The conditioning pump 144 in the preferred form is automatically controlled by a dual control system illustrated in FIGS. 26 and 27. A resistant temperature detector in the form of a probe 178, FIG. 18, is positioned in the storage chamber near the center thereof and a second resistant temperature detector in the form of a probe 179, FIG. 15, is mounted in the collector near the outlet from the collector so that each is disposed to sense the temperature at the respective locations. The temperature detectors are connected through a comparator circuit, illustrated in FIG. 27, to the control switch of the conditioning pump. The comparator circuit, as will be explained hereinafter, is used to compare the temperatures of the detectors 178 and 179 and to switch the conditioning pump on when the temperature of the detector 179 equals or succeeds by a predetermined amount the temperature of detector 178. By so controlling the operation of the conditioning pump, breakage of the collector glass panels by thermal shock is alleviated, the use of less insulation at the collector glass panels is allowed since heat is extracted rapidly from the collector cutting heat loss through the glass panels, and the life of the conditioning pump is extended due to less cycling. While other comparator circuits could be utilized, in the preferred form, the comparator circuit is in the form of a conventional wheatstone bridge where identical resistors R1 and R2 are connected in the bridge with a third resistor R3, the detector 178, the detector 179, and a rheostat 181. The operation of the wheatstone bridge circuit is conventional with the rheostat 181 serving to adjust or regulate the temperature differential between detectors 178 and 179 desired for operation of the conditioning pump. It will, therefore, be seen that with the dual control system, the temperatures in the storage chamber is automatically maintained or raised during normal weather conditions.

As mentioned previously, the aforedescribed heating apparatus can be easily connected into an existing forced air furnace system in a building structure. Referring to FIGS. 22-25, the manner in which the heating apparatus can be connected to a forced air furnace system is illustrated. Looking first at FIG. 22, the upper end of a typical forced air furnace unit 180 is illustrated having heat exchangers 182 in a heat exchange portion 184 of the unit and a plenum chamber 186 above the heat exchange portion 184 wherein the hot air emitted from the forced air furnace unit is directed into the circulating duct work in the building structure for desired distribution through the building structure. An outlet conduit 188 in the utility circulating system of the solar heating apparatus 28 of the present invention is connected to the plenum chamber 186 of the forced air heating unit through an opening 190 in one side thereof so that the air entering the plenum chamber from the solar heating apparatus will pass into the plenum chamber wherefrom it can be directed into the circulating duct work in the building structure for desired distribution throughout the structure. To prevent this air from passing downwardly into the forced air furnace when the forced air furnace is not in operation, a series of valve plates 192 are pivotally mounted across the open upper end of the heat exchange portion 184 of the forced air furnace apparatus so that in normal conditions when the forced air furnace is not in operation, these valve plates lie in the closed solid line positions of FIGS. 22 and 23. The valve plates include a rectangular planar section 194 with a pivet rod 196 along one longitudinal edge. The pivot rod extends beyond the ends of the rectangular planar section so that the ends of the rod can be journalled in suitable bearing members 198 shown as U-shaped brackets in FIG. 23, to pivotally support the valve plates in a horizontal disposition. The width of the rectangular planar section of each plate is such that the plate overlies the pivot rod of the next adjacent plate whereby when the plates are in their closed positions, the outlet from the heat exchange portion of the forced air furnace is blocked. Accordingly, air entering the plenum chamber from the solar heating apparatus 28 through the conduit 188 cannot flow downwardly but must flow upwardly and into the circulating duct work for desired distribution through the building structure.

When the forced air heating apparatus is in operation, however, the air being blown upwardly through the heat exchange portion 184 and into the plenum chamber 186 is sufficiently strong enough to pivot the valve plates 192 about their pivot rods so that they open into the dotted line position of FIG. 22 thereby allowing the air to pass into the plenum chamber and subsequently into the circulating duct work of the building structure. Pin stops 200 are provided for each valve plate to limit the pivotal movement of the plate. In this manner, the solar heating unit can be connected directly into the forced air heating unit and neither system will inhibit proper functioning of the other. Accordingly, when it is desired to operate the forced air furnace apparatus, it will operate independently of the solar heating unit and when the solar heating unit is operated, it can operate independently of the forced air heating apparatus.

Referring to FIG. 25, a schematic control circuit diagram is shown with the solar furnace system and a conventional forced air furnace system connected in a complementary fashion. It will be seen that as is conventional, a step-down transformer 204 converts the 110 volt A.C. input into a 24 volt potential which is placed on the coil 206 in a forced air gas furnace relay 208. The thermostat 210 in the house or building structure is also connected between the transformer 204 and the coil 206 so that the coil is not energized unless the house thermostat is closed, such was when the temperature in the house is below a preselected temperature. When the coil in the forced air gas furnace relay is energized, it closes a switch 212 which places a potential on the forced air furnace blower 214 and on a thermostat 216 in the solar furnace storage chamber. The forced air furnace blower, however, will not operate unless a furnace control switch 218 which is also temperature controlled and which is positioned within the forced air furnace is closed. This furnace control switch, however, does not close until the temperature within the forced air furnace is above a preselected level. The solar furnace storage chamber thermostat 216 is a double-throw switch so that when the temperature in the storage chamber is below a preselected temperature, the forced air furnace gas valve 219 is energized thereby causing the forced air furnace to heat and once the temperature of the furnace unit is above a preselected level, the furnace control switch closes thereby energizing the forced air furnace blower so that the hot air from the forced air furnace will be circulated through the building structure. However, if the temperature within the solar furnace storage chamber is above a preselected level, the solar furnace storage thermostat rather than energizing the forced air furnace gas valve 219 energizes the solar furnace blower or utility pump 170 so that the utility circulating air in the solar furnace is operated to heat the building structure. It will be appreciated, that in this manner, the conventional forced air heating system and the solar heating system of the present invention are used to supplement each other and depending upon the solar radiation in the particular area in which the unit is in operation, the solar furnace system can be predominately used with the forced air furnace system only as a back-up during unusual weather conditions. The operation of the conditioning pump 144 is automatically controlled by a dual sensor thermostat.

Referring to FIG. 21, it is seen that additional reflector panels have been mounted upon the solar heating unit 28 to increase the solar radiation received by the collector unit 34. As illustrated, reflector panels 220 are pivotally mounted along each side of the collector unit and a reflector panel 222 is mounted along the top edge of the collector unit to cooperate with the reflector panel 36 previously described as being connected along the bottom edge of the collector unit. Of course, during inclement weather conditions, when it is desirable that the glass or plastic insulator 96 on the collector unit be covered, each of the reflector panels can be folded inwardly into protective overlying face-to-face relationship with the collector unit.

It has been found by building the solar heating unit of the present invention in accordance with the previous description that the units can be made in a very compact manner and of a size to be positioned in a fairly inconspicuous manner adjacent to a building structure, such as a home, without materially detracting from the appearance of the home. In fact, it has been found that the unit can be placed in a normal sized backyard without taking up unreasonable ground space.

In a test unit, which was not placed in an optimum position for receiving maximum solar radiation, each of the top and bottom panels of the unit, the reflector panel, and the collector unit were approximately eight feet by twelve feet as opposed to the prior art arrangements wherein substantial portions of the roof of the building structures were needed to collect adequate solar radiation to heat the building structure. By utilizing the thermal cups in the collector unit, it was found that the solar heat absorbed by the unit was equivalent to a conventional planar collector unit that was sixteen feet by twenty-eight feet, or the solar absorbing capacity of the collector of the present unit was found to be approximately 4.75 times that of a conventional planar collector not utilizing the accumulator cups. When using gravel of approximately 1½ inches in diameter particle size, the unit has been found capable of obtaining temperatures at the hot end of the storage chamber of around 300°F, a mean storage chamber of approximately 240°F, and was found to lose only 1½° to 5° (depending upon outside ambient temperature) per day when the conditioning and utility pumps were not operated. Since typical forced air furnace systems only obtain mean temperatures of about 130° in the plenum chamber, it will be appreciated that due to higher operating temperatures, the solar unit utility pump does not require as long a duration of operating cycles as a forced air furnace to maintain a given temperature in the building structure with the same outside ambient temperatures. Since a particular storage material inherently absorbs and emits heat at approximately the same rate, and since the rate at which heat is exposed to the storage material is excessive in the present invention apparatus of the absorptive capability of the storage material, the rise and fall of the storage material temperature occurs at the same rate given similar pump capacities of the utility and conditioning pumps, and not unusual temperature differentials in the building structure being heated and exclusive of simultaneous conduction losses through the walls of the apparatus.

While the foregoing description has been directed to the heating capability of the apparatus of the present invention, it should be appreciated that the apparatus is also capable of cooling building structures and therefore has a dual capability. When using the apparatus to cool a building structure, it is connected to the building structure in the same manner as previously described but instead of storing solar heat during daylight hours, the unit is closed during the daylight hours with the reflector panel 36 lying over the collector unit 34 to prevent solar heat from being absorbed by the collector unit. Then, when the sun is not shining, the conditioning pump is then operated to circulate air through the collector and the storage chamber wherein heat is removed from the storage material 76 or gravel in the storage chamber. After the gravel has been adequately cooled, and before the ambient air begins to warm up during daylight hours, the conditioning pump 144 is turned off thermostatically. When cool air is desired in a building structure, the utility pump 170 is operated to circulate air through the relatively cool storage material to thereby remove heat from the building structure.

Although the present invention has been described with a certain degree of particularity, it is understood that the present disclosure has been made by way of example and that changes in details of structure may be made without departing from the spirit thereof.

What is claimed is:

1. A method of heating a building structure comprising the steps of:

absorbing solar heat on a collector surface wherein said collector surface is insulated from the ambient environment, passing air across the collector surface in a heat transfer process whereby the heat absorbed by the collector surface is transferred to the air, passing the hot air leaving the collector surface through a horizontal duct disposed at a lower elevation than the collector surface, passing the hot air emanating from said duct into an elevated storage chamber wherein said storage chamber has material with heat absorbent and heat retaining characteristics whereby heat in the hot air is transferred from the hot air to said material and retained thereby, and intermittently directing a utility flow of fluid from said storage chamber into the building structure via a duct disposed at a lower elevation than said storage chamber to reduce the temperature differential between the interior of the building structure and the interior of the storage chamber.

2. The method of claim 1 wherein a conditioning flow of air is circulated through the storage chamber and the collector and the utility flow of fluid is circulated through the storage chamber and the building structure and wherein the conditioning air flow and utility fluid flow circulate in opposite directions through the storage chamber.

3. The method of claim 2 wherein said conditioning flow of air is passed through a series of reversing bends as it crosses said collector surface.

4. The method of claim 2 wherein said conditioning air is passed through a series of reversing bends as it passes through the storage chamber.

* * * * *